US008708523B2

(12) United States Patent
Lin et al.

(10) Patent No.: US 8,708,523 B2

(45) Date of Patent: Apr. 29, 2014

(54) PANORAMA LAMP WITH 360 DEGREE PERIPHERAL ILLUMINATION

(75) Inventors: Ming-Te Lin, New Taipei (TW); Ming-Yao Lin, New Taipei (TW); Heng Qiu, New Taipei (TW)

(73) Assignee: Uniled Lighting Taiwan Inc., New Taipei (TW)

( * ) Notice: Subject to any disclaimer, the term of this patent is extended or adjusted under 35 U.S.C. 154(b) by 190 days.

(21) Appl. No.: 13/435,081

(22) Filed: Mar. 30, 2012

(65) Prior Publication Data

US 2013/0258657 A1 Oct. 3, 2013

(51) Int. Cl.

*F21V 1/00* (2006.01)
*F21V 11/00* (2006.01)
*B60Q 1/26* (2006.01)

(52) U.S. Cl.

USPC ............ 362/235; 362/227; 362/234; 362/236

(58) Field of Classification Search

None

See application file for complete search history.

(56) References Cited

U.S. PATENT DOCUMENTS

| | | | | |
|---|---|---|---|---|
| 6,220,722 | B1 | 4/2001 | Begemann | |
| 7,329,905 | B2 * | 2/2008 | Ibbetson et al. | 257/98 |
| 7,683,475 | B2 * | 3/2010 | Lee et al. | 257/723 |
| 7,871,839 | B2 * | 1/2011 | Lee et al. | 438/34 |
| 8,232,709 | B2 * | 7/2012 | Betsuda et al. | 313/46 |
| 2013/0094199 | A1 * | 4/2013 | Lin et al. | 362/218 |
| 2013/0215625 | A1 * | 8/2013 | Takeuchi et al. | 362/363 |

* cited by examiner

*Primary Examiner* — Natalie Walford

(74) *Attorney, Agent, or Firm* — Lowe Hauptman & Ham, LLP

(57) ABSTRACT

A panorama lamp with 360 degree peripheral illumination with reference to an axis of the lamp is disclosed. Each of the light units mounted on a heat sink has a light chip facing outward from the lamp. Either a protection cap or a circular wall lens can be optionally adopted to cap the top of the lamp. The protection cap provides protection to the chips of the lamp from being damaged. The circular wall lens modifies the beam profile of the lamp to meet various market requests.

33 Claims, 24 Drawing Sheets

(US 6,220,722)

100

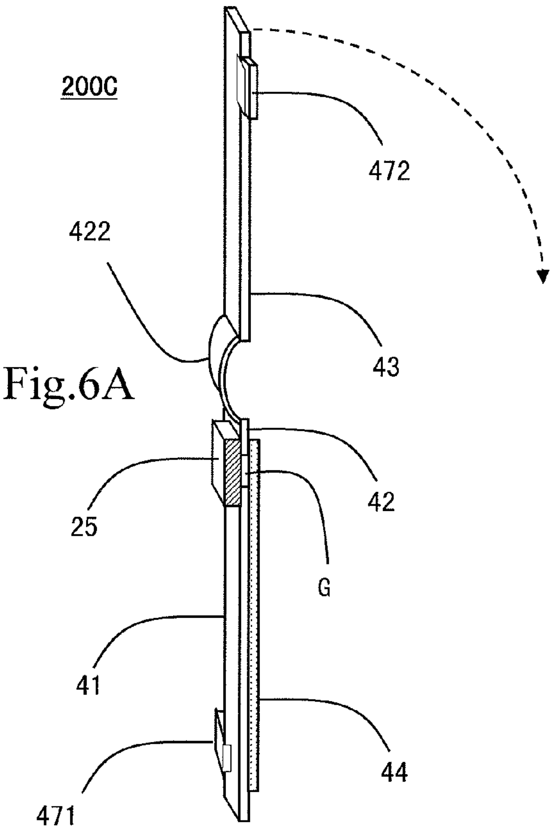
Fig.6A
Fig.6B
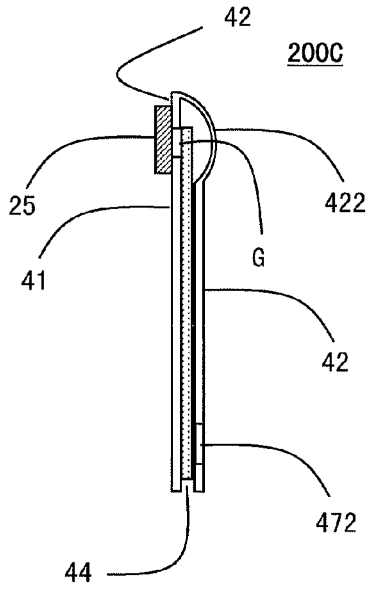
Fig.6C
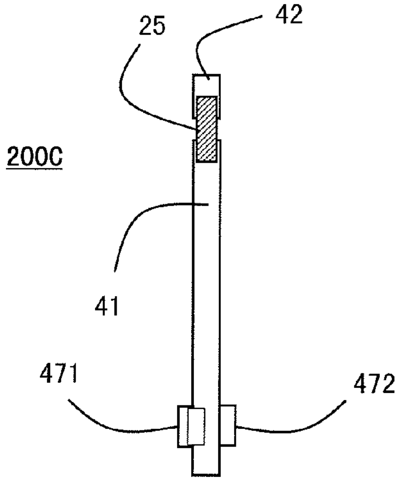
Fig.6D
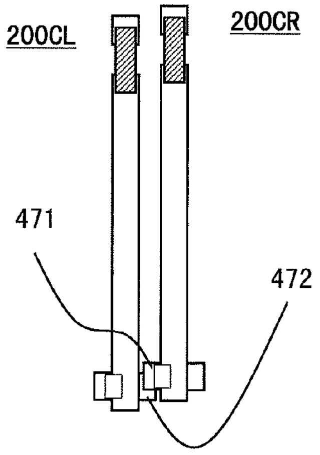

PANORAMA LAMP WITH 360 DEGREE PERIPHERAL ILLUMINATION

BACKGROUND

1. Technical Field

The present invention relates to a panorama lamp composed of a plurality of light units mounted on a base. The light unit facing outward from the lamp with a direction normal to a longitudinal axis of the lamp.

2. Description of Related Art

FIG. 1 is a prior art, U.S. Pat. No. 6,220,722 disclosed a traditional LED lamp 100. The LED lamp 100 comprises a gear column 1, a metal lamp base 2, a cube metal substrate 3 with light emitted diode (LED) 4, an envelope 5, outlet holes 6 and inlet holes 7 for an air flow generated by forced air cooling. The metal substrate 3 is cube-shaped with six flat faces, and is connected to gear column 1 via a vertex of the cube. The metal substrate 3 is made of a metal or a metal alloy, thereby enabling good heat conduction from the LED 4 to the gear column 1 to be achieved. Each face of the pyramid is provided with a number of (eight or nine) LED 4 which is secured to the face by means of a heat-conducting adhesive.

The defect of the prior art is that the metal substrate 3 is a common block heat sink which has a relatively low efficiency in heat dissipation due to the bulky body and relatively smaller surface area left for heat dissipation. A higher heat dissipation LED lamp need to be conceived. Higher dissipation efficiency means a more light intensity for a LED lamp can be obtained.

BRIEF DESCRIPTION OF THE DRAWINGS

FIGS. 6A~6D is a third light unit of the present invention.

DETAILED DESCRIPTION OF THE INVENTION

This invention discloses a plurality of striped metal-insulation-metal (MIM) lead, bearing one or more LED to form a light unit, mounted onto an inner surface of a tube substrate with light emitted outward to form a high efficiency heat dissipation LED lamp. The LED straddles a gap between two coplanar contacts of the MIM lead. The MIM lead provides more surfaces area for heat dissipation and therefore displays a better heat dissipation for the lamp; an LED lamp with a higher light intensity can be obtained.

FIGS. 2A~2D is a first light unit of the present invention.

Figure 1:
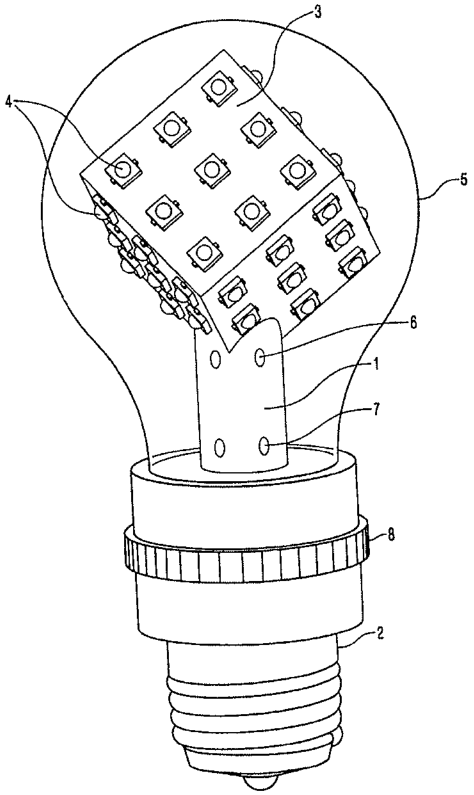
Fig.1 Prior Art
FIG. 1 is a prior art.
Figure 2A:
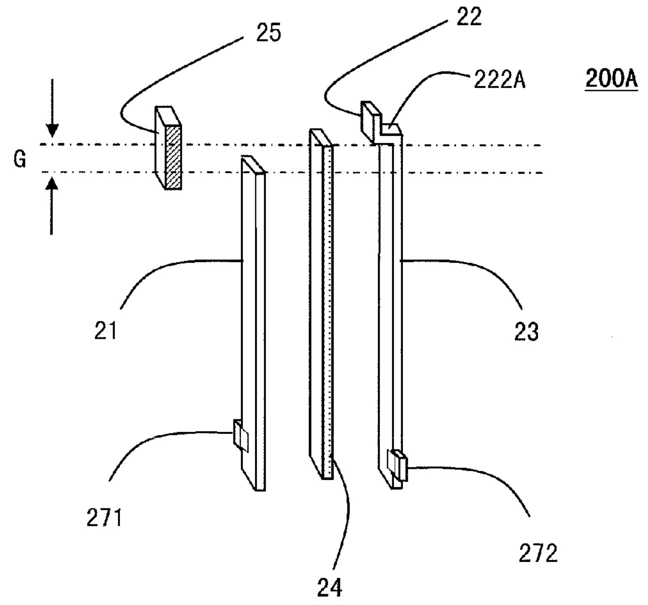
FIGS. 2A~2D is a first light unit of the present invention.

FIG. 2A shows pieces of a light unit 200A being prepared, including a light chip 25, a first metal 21 having a first tab 271, an insulation layer 24, a second metal 22, a third metal 23 having a second tab 272, and a bridging metal 222A connecting the second metal 22 with the third metal 23.

Figure 2B:
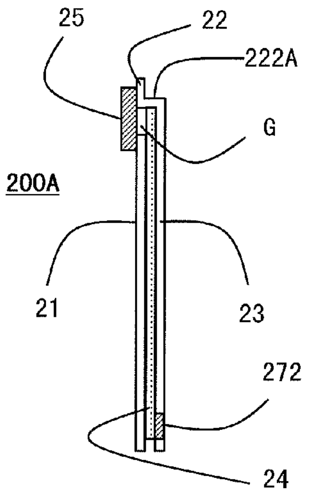

FIG. 2B shows a combination of the pieces of FIG. 2A. FIG. 2B shows a light unit 200A is assembled, where the second metal 22 has a left surface coplanar with a left surface of the first metal 21; a gap G is formed between the first metal 21 and the second metal 22; the third metal 23 is configured right side to and parallel with the first metal 21; the insulation layer 24 is configured in between the first metal 21 and the third metal 23. The light chip 25 straddles the gap G and has a first bottom electrode (not shown) coupled to the first metal 21, and has a second bottom electrode (not shown) coupled to the second metal 22. The bridging metal 222A connects a bottom end of the second metal 22 to a top end of the third metal 23. A connection of the bridging metal 222A and the third metal 23 forms an L-shaped turn. In the embodiment, a connection of the second metal, the bridging metal and the third metal forms an N-shaped turn.

Figure 2C:
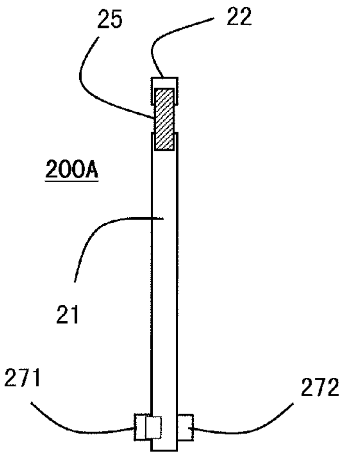

FIG. 2C is a front view of the light unit 200A of FIG. 2B. FIG. 2C shows that the second metal 22 is on the top, and the first metal 21 is on the bottom, the light chip 25 straddles the gap G in between the second metal 22 and the first metal 21. The first metal 21 has a left tab 271 extending from a fringe of the first metal 21; and the third metal 23 has a right tab 272 extending from a fringe of the third metal 23. The second tab 272 has an elevation similar to an elevation of the first tab 271, so that the first tab 271 is being able to electrically contact the second tab 272 of a neighboring second unit 200A.

Figure 2D:
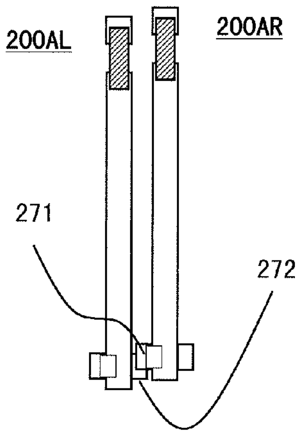

FIG. 2D shows two light units in serial connection

FIG. 2D shows that two light units are configured side by side, the left light unit 200AL has a right tab 272 contacting with a left tab 271 of the right light unit 200AR for an electrical connection in serial.

FIGS. 3A~3D is a second light unit of the present invention.

Figure 3A:
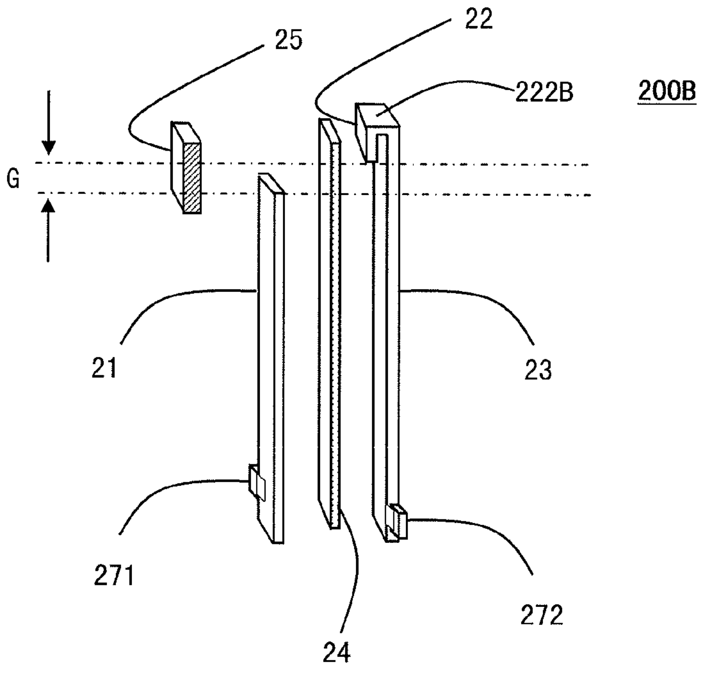
FIGS. 3A~3D is a second light unit of the present invention.

FIG. 3A shows pieces of a second light unit 200B being prepared, including a light chip 25, a first metal 21 having a first tab 271, an insulation layer 24, a second metal 22, a third metal 23 having a second tab 272, and a bridging metal 222B. The difference between the light unit 200B and 200A is that the bridging metal in different location. The bridging metal 222A is relatively in a lower position and the bridging metal 222B is relatively in an upper position.

Figure 3B:
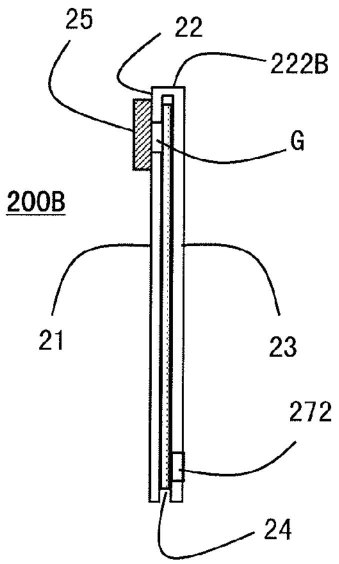

FIG. 3B shows a combination of the pieces of FIG. 3A.

FIG. 3B shows that a light unit 200B is assembled, where the second metal 22 has a left surface coplanar with a left surface of the first metal 21; a gap G is formed between the first metal 21 and the second metal 22; the third metal 23 is configured right side to and parallel with the first metal 21; the insulation layer 24 is configured in between the first metal 21 and the third metal 23. The light chip 25 straddles the gap G and has a first bottom electrode (not shown) coupled to the first metal 21, and has a second bottom electrode (not shown) coupled to the second metal 22. The bridging metal 222B connects a top end of the second metal 22 to a top end of the third metal 23. A connection of the bridging metal 222B and the third metal 23 forms an L-shaped turn.

Figure 3C:
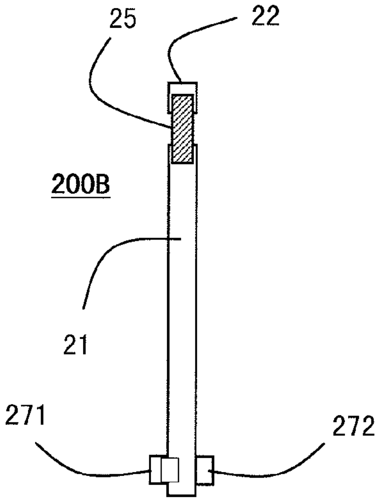

FIG. 3C is a front view of the light unit 200B of FIG. 3B.

FIG. 3C shows that the second metal 22 is on the top, and the first metal 21 is on the bottom, the light chip 25 straddles the gap G in between the second metal 22 and the first metal 21. The first metal 21 has a left tab 271 extending from a fringe of the first metal 21; and the third metal 23 has a right tab 272 extending from a fringe of the third metal 23. The second tab 272 has an elevation similar to an elevation of the first tab 271, so that the first tab 271 is being able to electrically touch the second tab 272 of a neighboring second unit 200B.

Figure 3D:
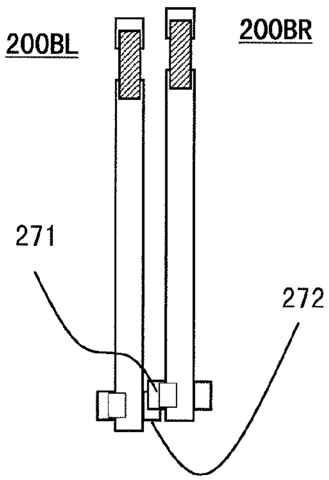

FIG. 3D shows two light units in serial connection

FIG. 3D shows that two light units are configured side by side, the left light unit 200BL has a right tab 272 contacting with a left tab 271 of the right light unit 200BR for an electrical connection in serial.

Figure 4A:
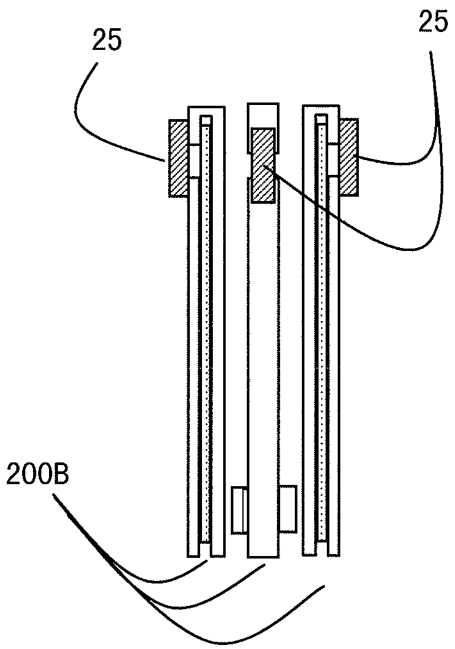
FIGS. 4A~4B is components for a first lamp according to the present invention.
Figure 4B:
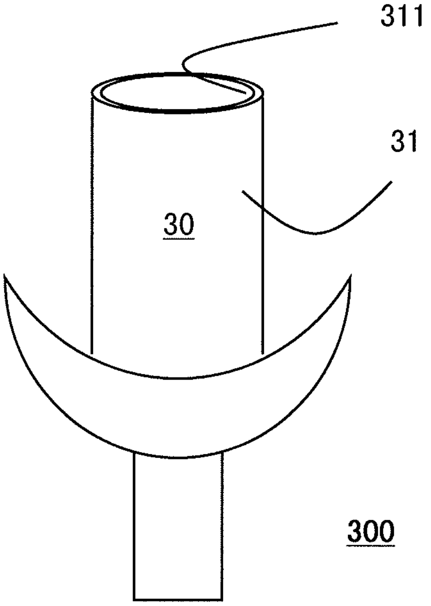

FIGS. 4A~4B is components for a first lamp according to the present invention.

FIG. 4A shows a plurality of light unit 200B as an example, where each light unit 200B can be replaced by light unit 200A, prepared for a panorama lamp 31. FIG. 4B shows a base 300 prepared, which has a tube substrate 30 on the top. The tube substrate 30 has a circular wall 31 which has an inner wall surface 311.

Figure 5:
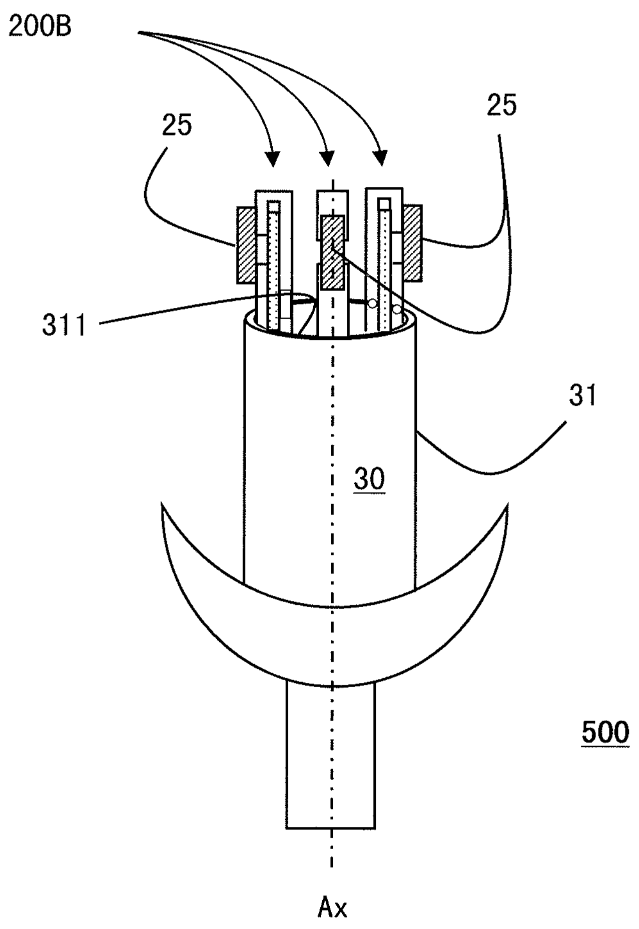
FIG. 5 is a first lamp assembled according to FIGS. 4A~4B

FIG. 5 is a first lamp assembled according to FIGS. 4A~4B.

FIG. 5 shows a panorama lamp 500 assembled with the pieces of FIGS. 4A~4B. The light units 200B are each attached onto the inner wall surface 311 of the circular wall 31 with light chip 25 facing outward, with reference to a longitudinal axis Ax of the tube substrate 30, to form a panorama lamp 500.

FIGS. 6A~6D is a third light unit of the present invention.

FIG. 6A shows pieces of a third light unit 200C being prepared, including a light chip 25, a first metal 41 having a first tab 471, an insulation layer 44, a second metal 42, a third metal 43 having a second tab 472, and a bridging metal 422. The bridging metal 422 is a belly-shaped metal which is bendable.

FIG. 6B shows a light unit assembled with the pieces of FIG. 6A

FIG. 6B shows a light unit 200C is assembled, where the second metal 42 has a left surface coplanar with a left surface of the first metal 41; a gap G is formed between the first metal 41 and the second metal 42; the third metal 43 is configured right side to and parallel with the first metal 41 through bending the bridging metal 422 in 180 degree downward (see the arrow of FIG. 6A); the insulation layer 44 is sandwiched in between the first metal 41 and the third metal 43. The light chip 25 straddles the gap G and has a first bottom electrode (not shown) coupled to the first metal 41, and has a second bottom electrode (not shown) coupled to the second metal 42. The belly-shaped bridging metal 422 connects a top end of the second metal 42 to a top end of the third metal 43.

FIG. 6C is a front view of the light unit 200C of FIG. 6B.

FIG. 6C shows that the second metal 42 is on the top, and the first metal 41 is on the bottom, the light chip 25 straddles the gap G in between the second metal 42 and the first metal 41. The first metal 41 has a left tab 471 extending from a fringe of the first metal; and the third metal 43 has a right tab 472 extending from a fringe of the third metal. The second tab 472 has an elevation similar to an elevation of the first tab 471, so that the first tab 471 is being able to electrically contact the second tab 472 of a neighboring second unit 200C.

FIG. 6D shows two light units in serial connection

FIG. 6D shows that two light units are configured side by side, the left light unit 200CL has a right tab 472 contacting with a left tab 471 of the right light unit 200CR for an electrical connection in serial.

Figure 7A:
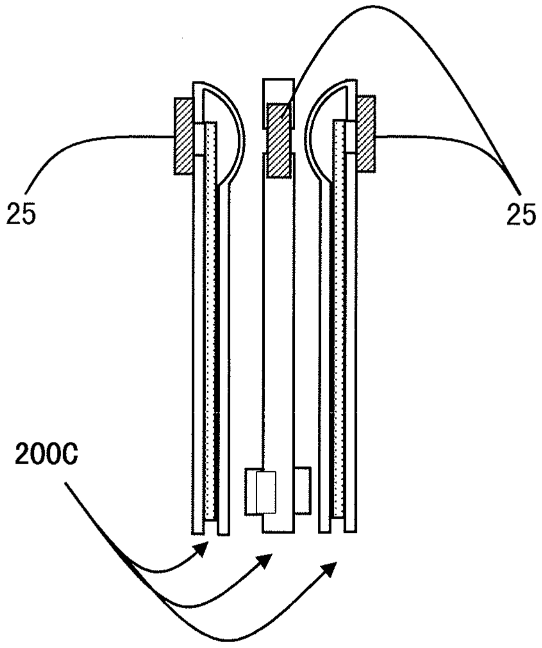
FIGS. 7A~7B is components for a second lamp according to the present invention.
Figure 7B:
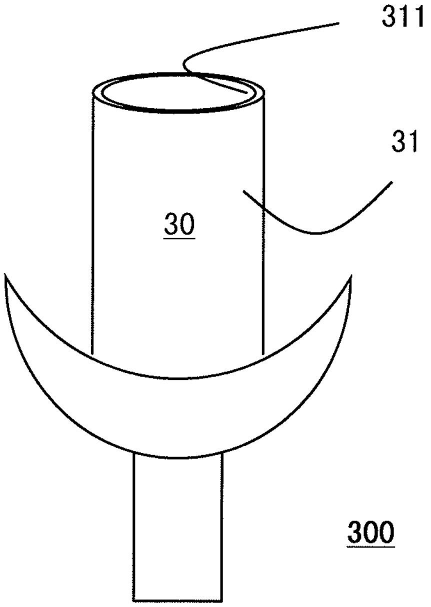

FIGS. 7A~7B is components for a second lamp according to the present invention.

FIG. 7A shows a plurality of light unit 200C as an example, where light units 200C can be replaced by either light unit 200A or light unit 200B, prepared for a panorama lamp 800. FIG. 7B shows that a base 300 is prepared, which has a tube substrate 30 on the top. The tube substrate 30 has a circular wall 31 which has an inner wall surface 311.

Figure 8:
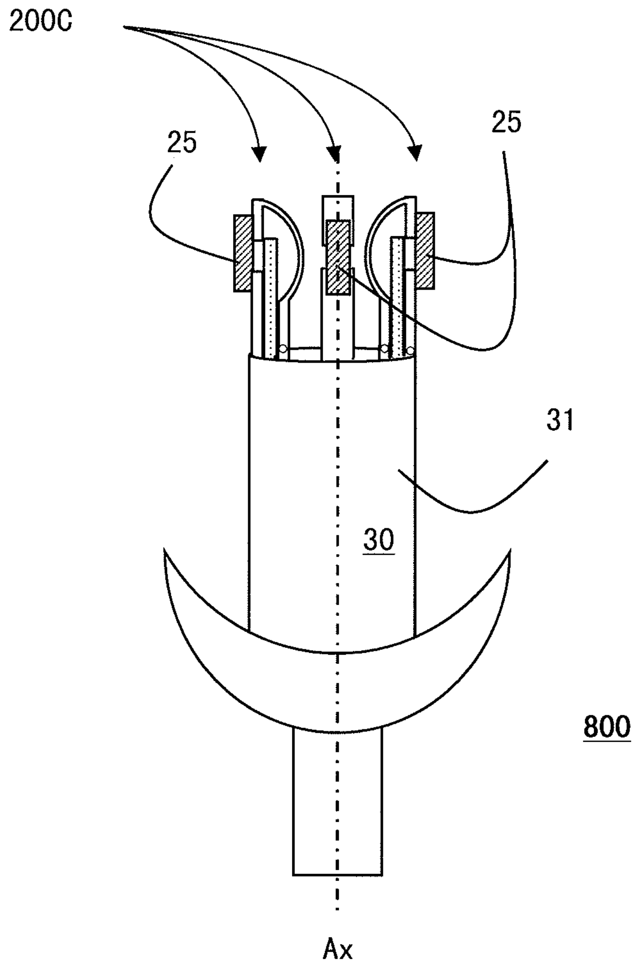
FIG. 8 is a second lamp assembled according to FIGS. 7A~7B

FIG. 8 is a second lamp assembled according to FIGS. 7A~7B

FIG. 8 shows a panorama lamp 800 assembled with the pieces of FIGS. 7A~7B. The light units 200C are each attached onto the inner wall surface 311 of the circular wall 31 with light chip 25 facing outward, with reference to a longitudinal axis Ax of the tube substrate 30, to form a panorama lamp 800.

Figure 9:
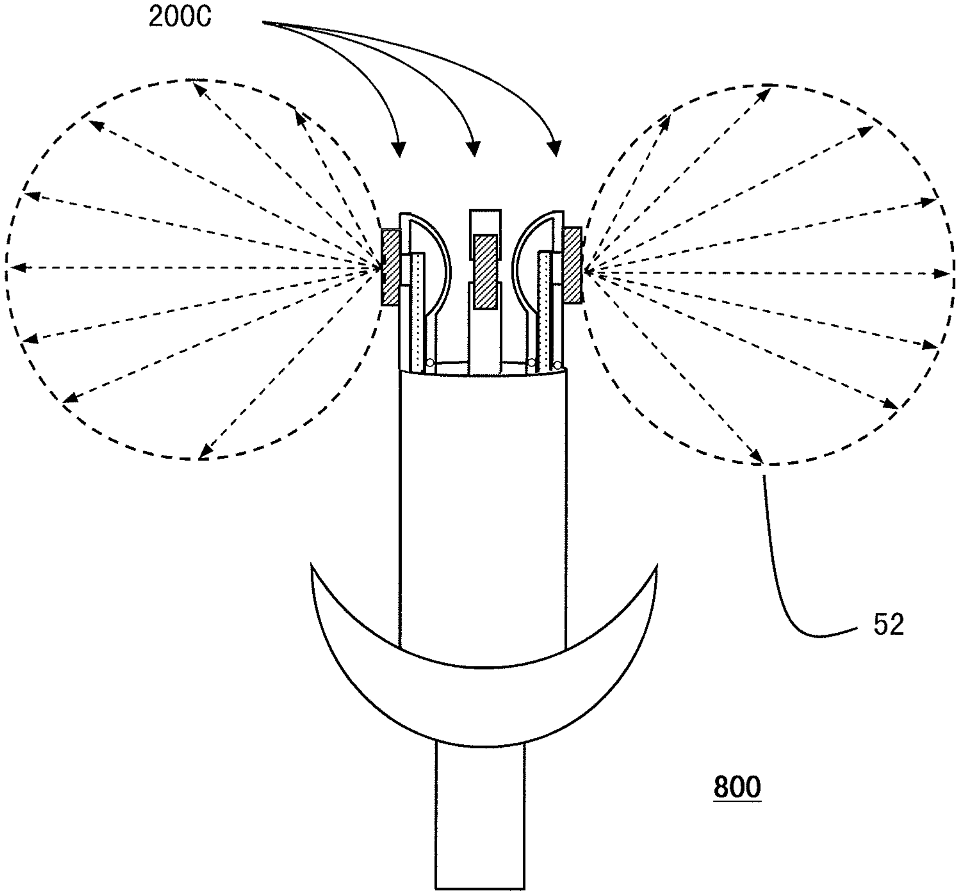
FIG. 9 is a beam profile for the lamp of FIG. 5 or FIG. 8

FIG. 9 is a beam profile for the lamp of FIG. 5 or FIG. 8.

FIG. 9 shows a beam profile 52 of the lamp 500 of FIG. 5 or the lamp 800 of FIG. 8.

Figure 10:
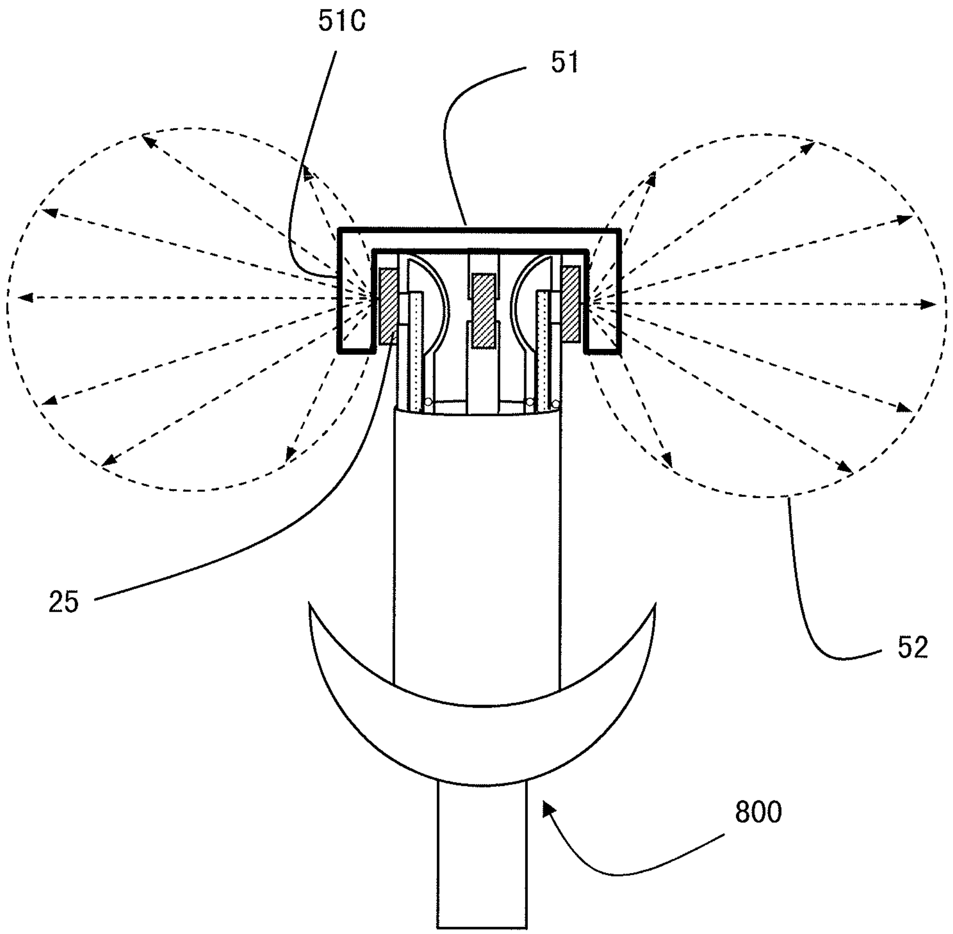
FIG. 10 is a circular wall protection cap used for the lamp according to the present invention.

FIG. 10 is a protection cap used for the lamp according to the present invention.

FIG. 10 shows that a transparent circular wall protection cap 51 is optionally mounted on a top of the lamp 800. The cap 51 has a transparent top plate and has a circular wall 51C configured on the bottom. The circular wall 51C is configured in front of the light chips 25 for a protection to the chips 25. The lamp 800 develops a beam profile 52.

Figure 11:
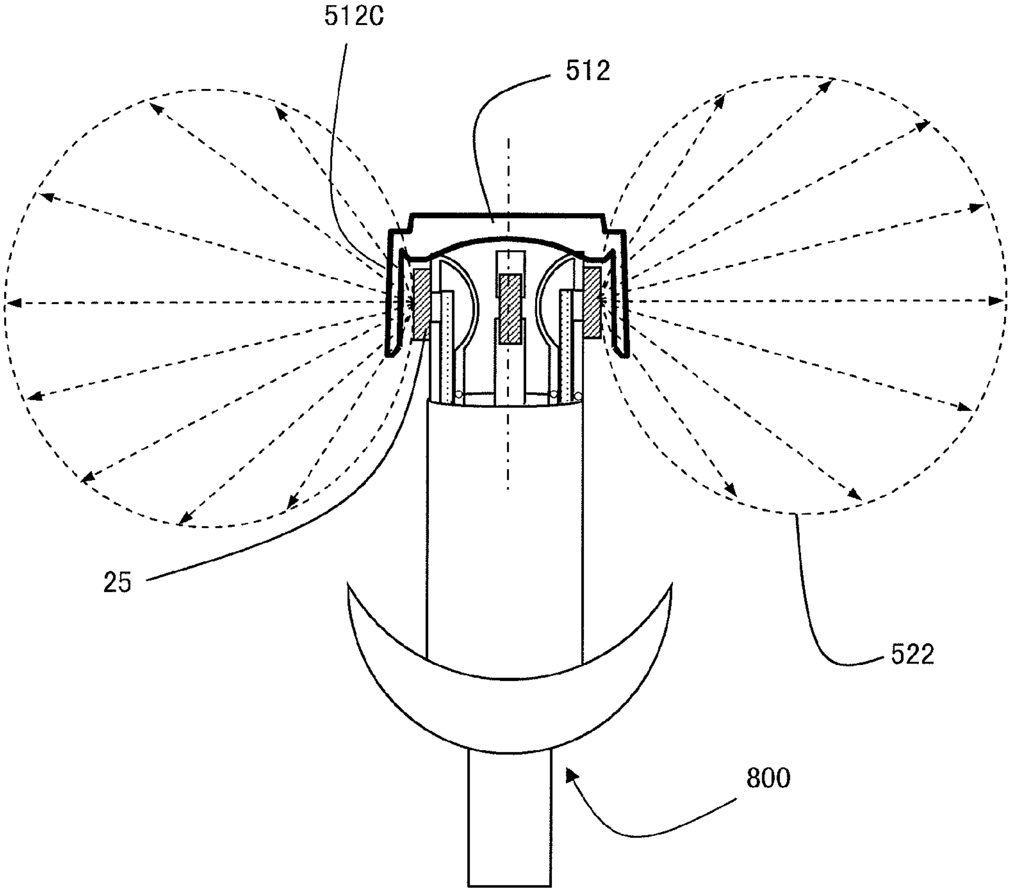
FIG. 11 is another circular wall protection cap used for the lamp according to the present invention.

FIG. 11 is another circular wall protection cap used for the lamp according to the present invention.

FIG. 11 shows that the cap 512 has transparent top plate and a circular wall 512C. The circular wall 512C is tapered out and configured in front of the light chips 25 as a protection to the chips 25. The lamp 800 develops a beam profile 522.

Figure 12:
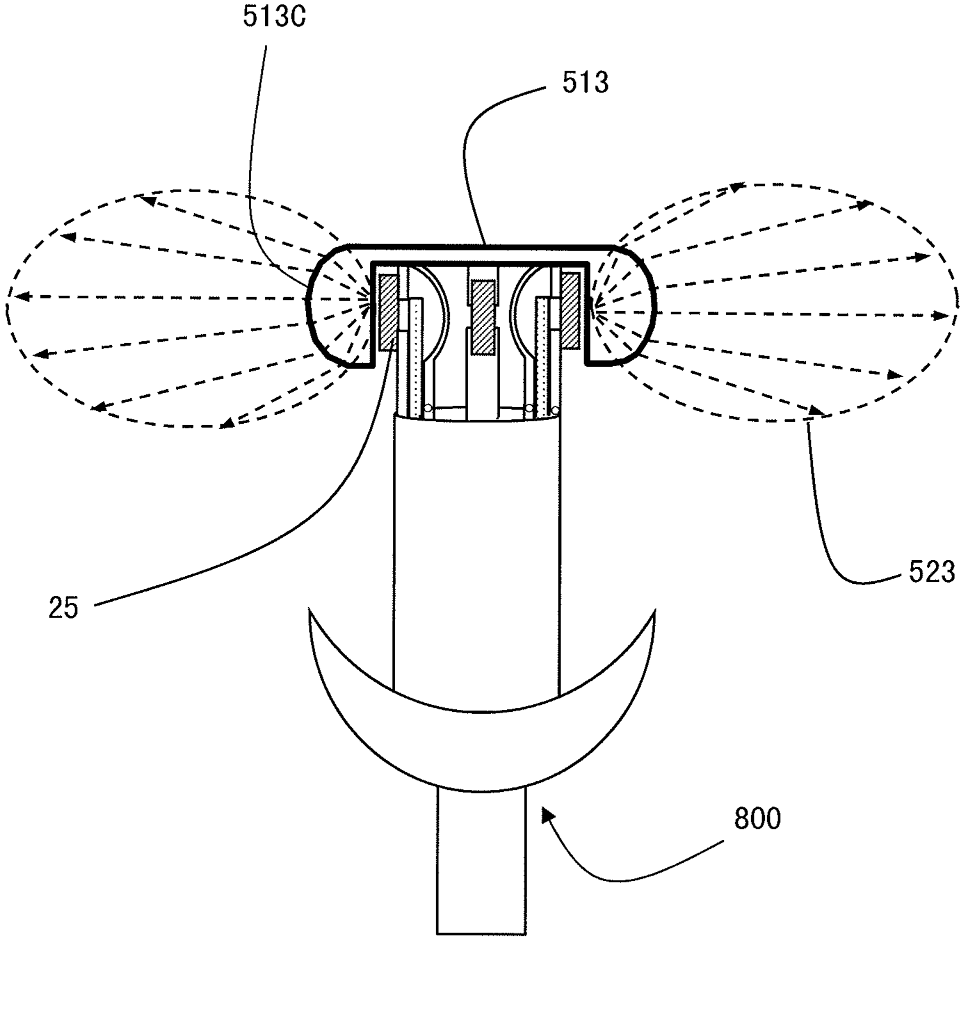
FIG. 12 is a first cap lens used for the lamp according to the present invention.

FIG. 12 is a first cap lens used for the lamp according to the present invention.

FIG. 12 shows that a circular wall cap lens 513 has a transparent top plate and a circular wall lens 513C. The circular wall lens 513C, configured in front of the light chips 25, functions as a plano-convex lens with respective to each light chip 25. The wall lens 513C modifies the light emission of the light chips 25 to develop a beam profile 523.

Figure 13:
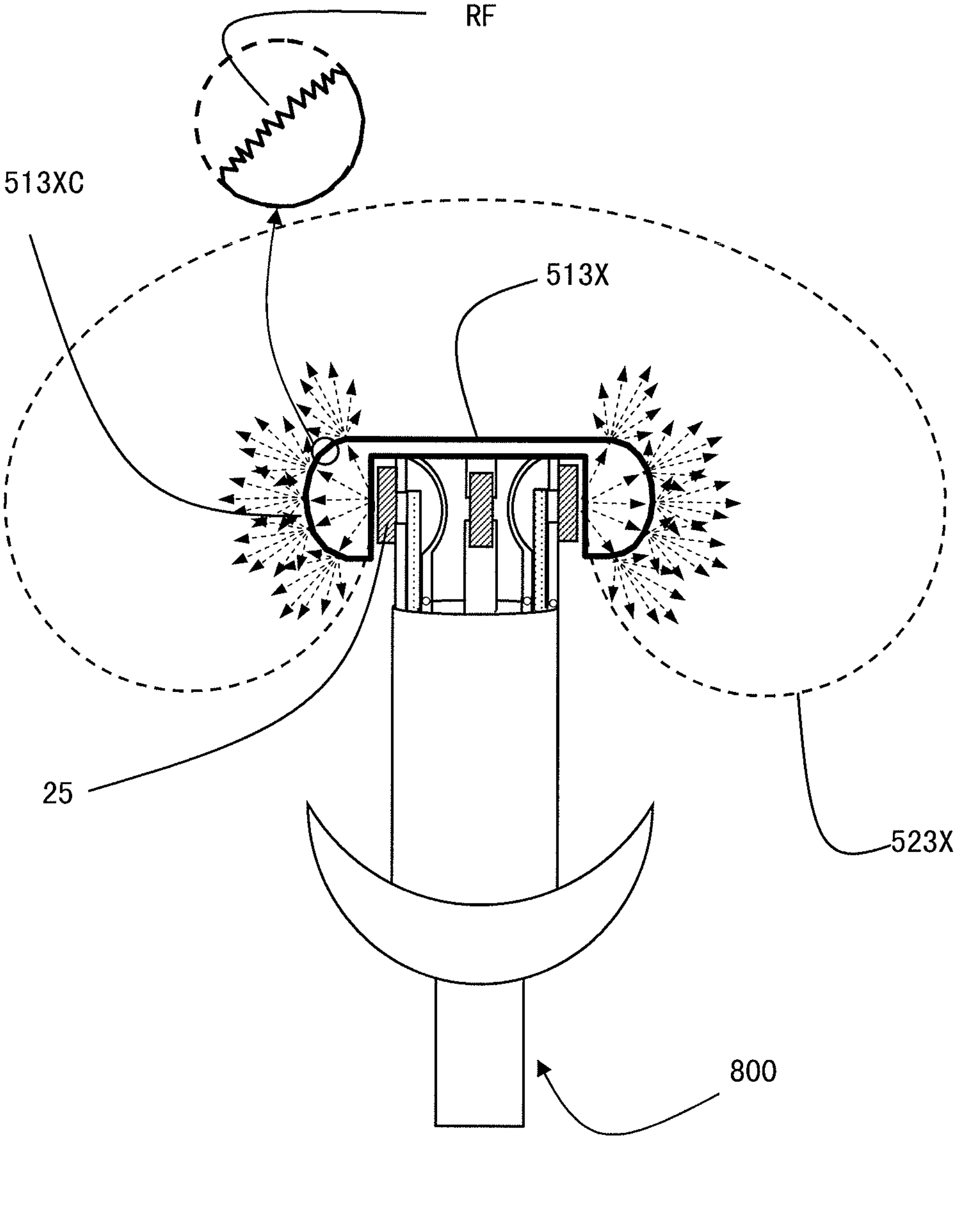
FIG. 13 is a second cap lens used for the lamp according to the present invention.

FIG. 13 is a second cap lens used for the lamp according to the present invention.

FIG. 13 shows that the circular wall cap lens 513X has been roughed on an outer surface of its wall lens 513XC to form a roughed surface RF in order to give a different modification effect to the light emission. The wall lens 513XC modifies the light emission of the light chips 25 to develop a beam profile 523X.

Figure 14:
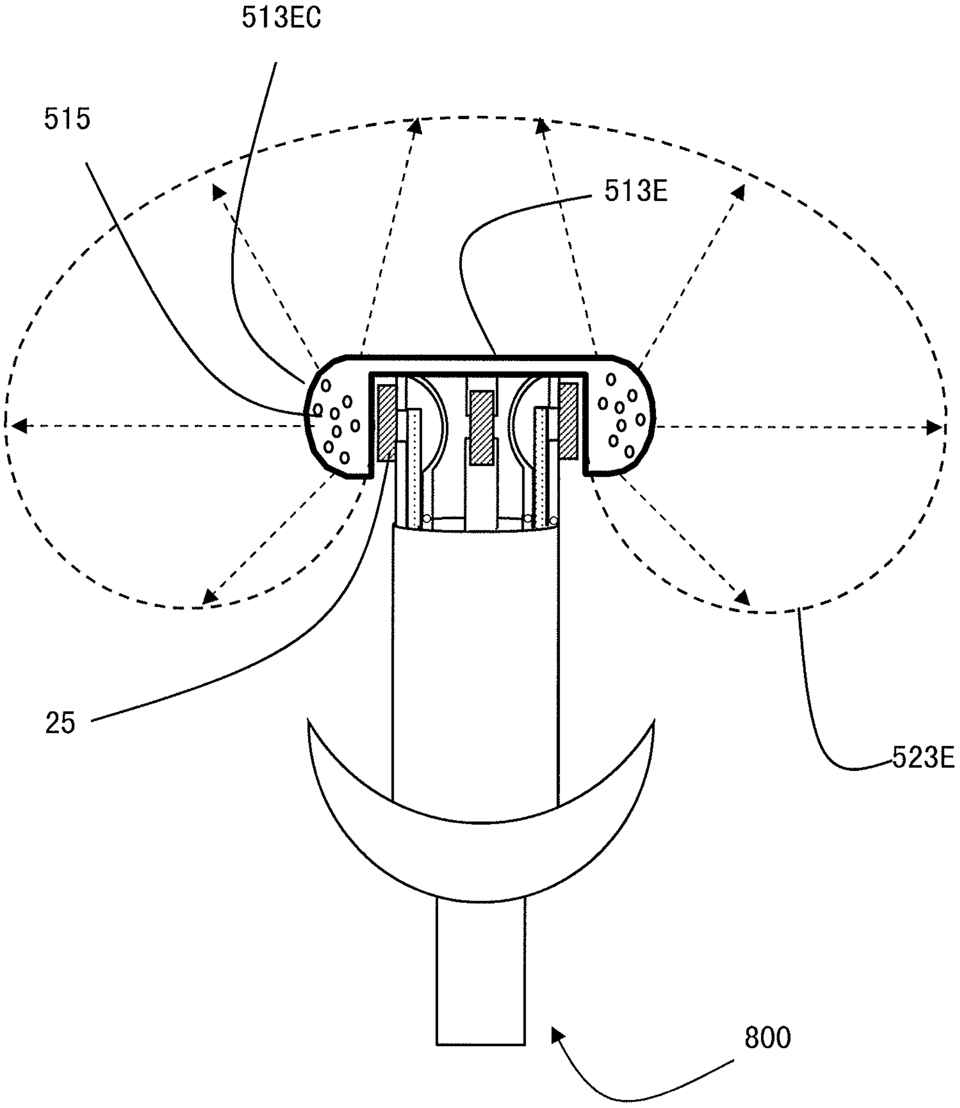
FIG. 14 is a third cap lens used for the lamp according to the present invention.

FIG. 14 is a third cap lens used for the lamp according to the present invention.

FIG. 14 shows that the circular wall cap lens 513E has reflective particles 515 mixed inside the wall lens 513EC to give a different modification effect to the light emission. The wall lens 513EC modifies the light emission of the light chips 25 to develop a beam profile 523E.

Figure 15:
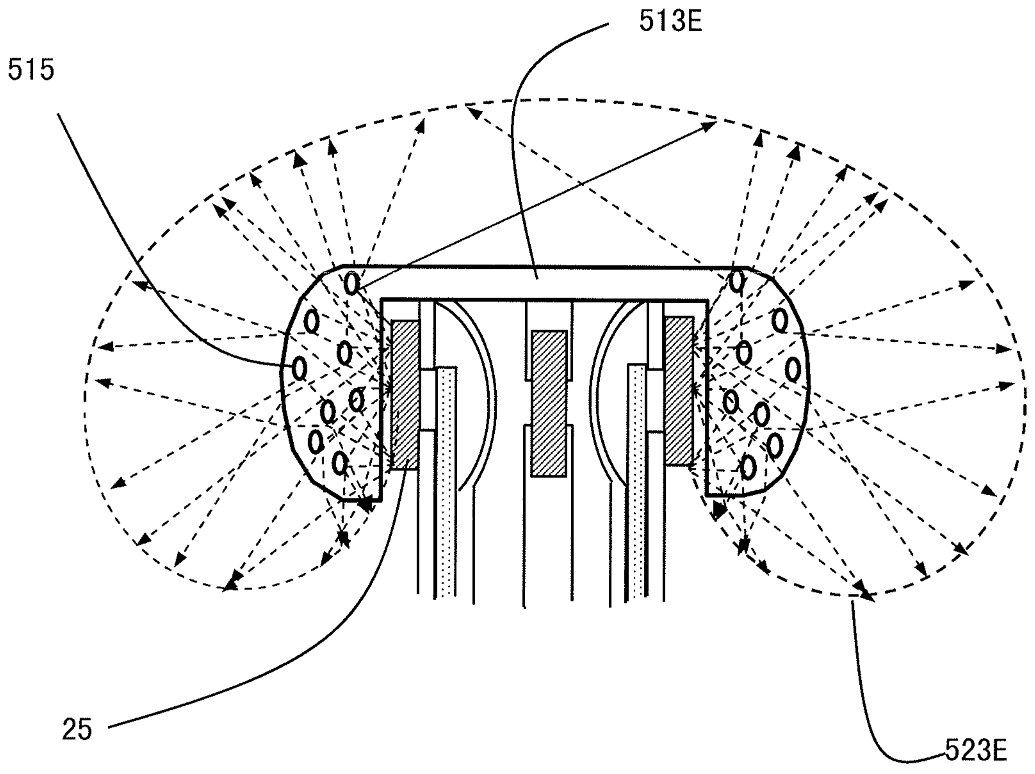
FIG. 15 is a detailed beam direction for the cap lens of FIG. 14

FIG. 15 is a detailed beam direction for the cap lens of FIG. 14.

FIG. 15 shows the beam profile 523E develops some light emission on top of the lens 513E.

Figure 16:
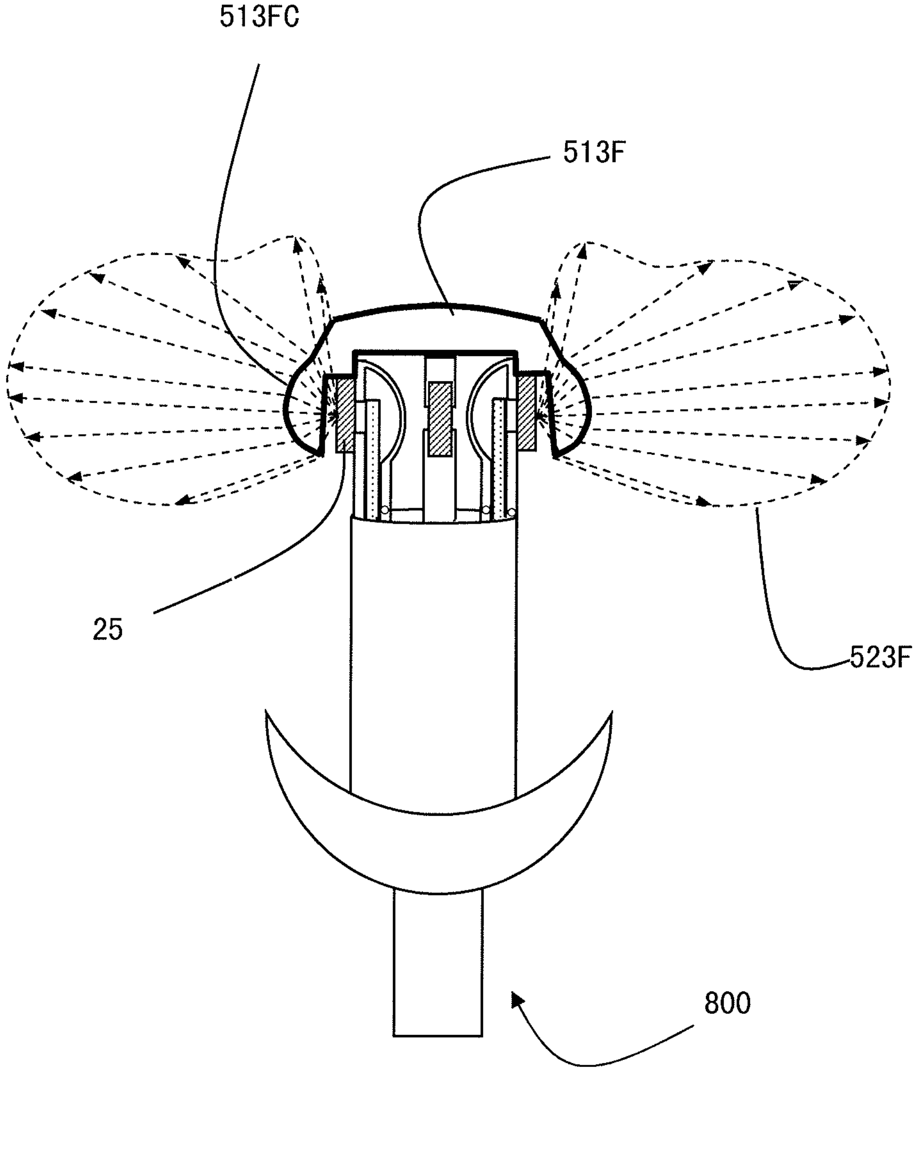
FIG. 16 is a fourth cap lens used for the lamp according to the present invention.

FIG. 16 is a fourth cap lens used for the lamp according to the present invention.

FIG. 16 shows that a cap lens 513F is used. The lens 513F is a modified version to the lens 513E. The wall lens 513FC is a plano-convex lens, with an inner surface tapered out and the convex surface is therefore deviated. With the deviation of the wall lens 513FC, beam profile 523F deviates inward a longitudinal axis of the cap lens 513F.

Figure 17:
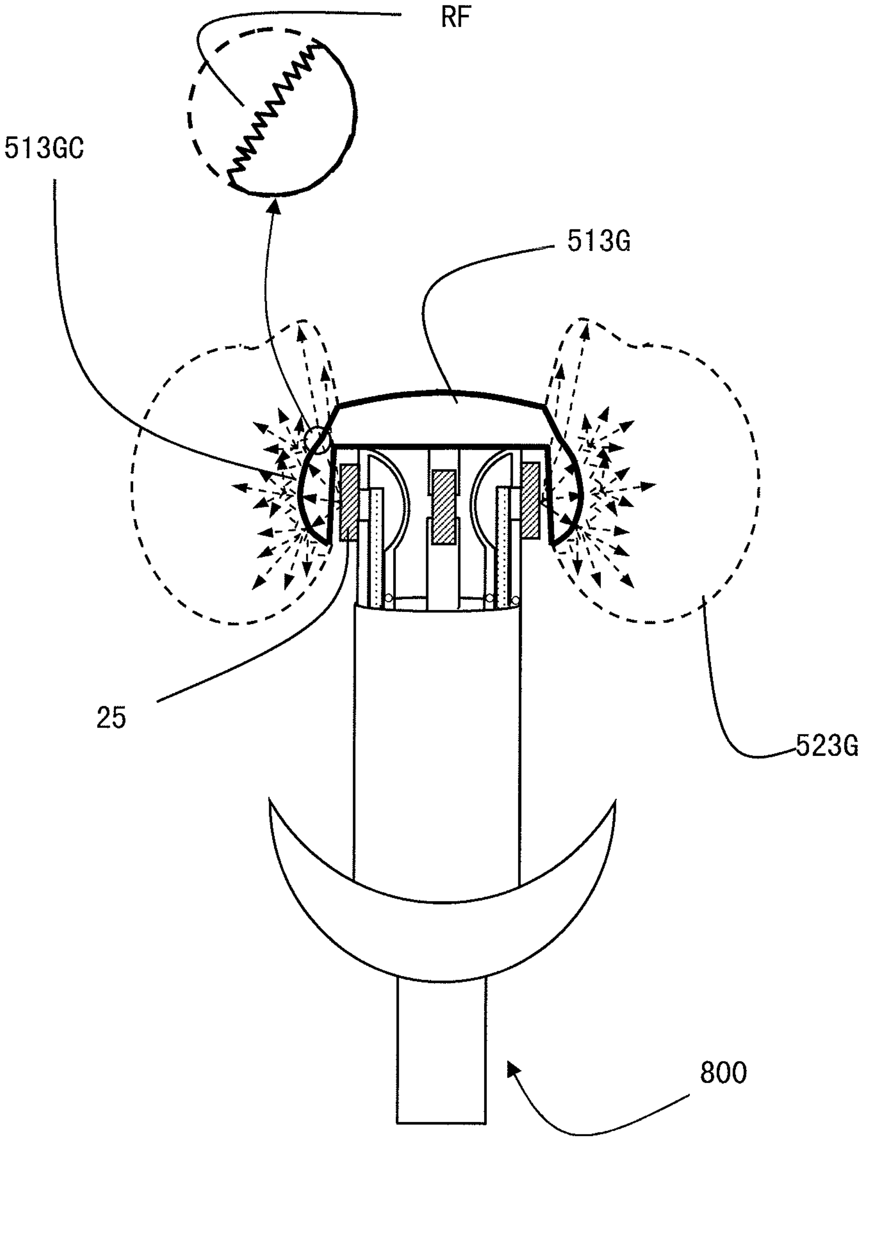
FIG. 17 is a fifth cap lens used for the lamp according to the present invention.

FIG. 17 is a fifth cap lens used for the lamp according to the present invention.

FIG. 17 shows that the circular wall cap lens 513G has been roughed on an outer surface of its wall lens 513GC to form a roughed outer surface RF in order to give a different modification effect to the light emission. The wall lens 513GC modifies the light emission of the light chips 25 to develop a beam profile 523G.

Figure 18:
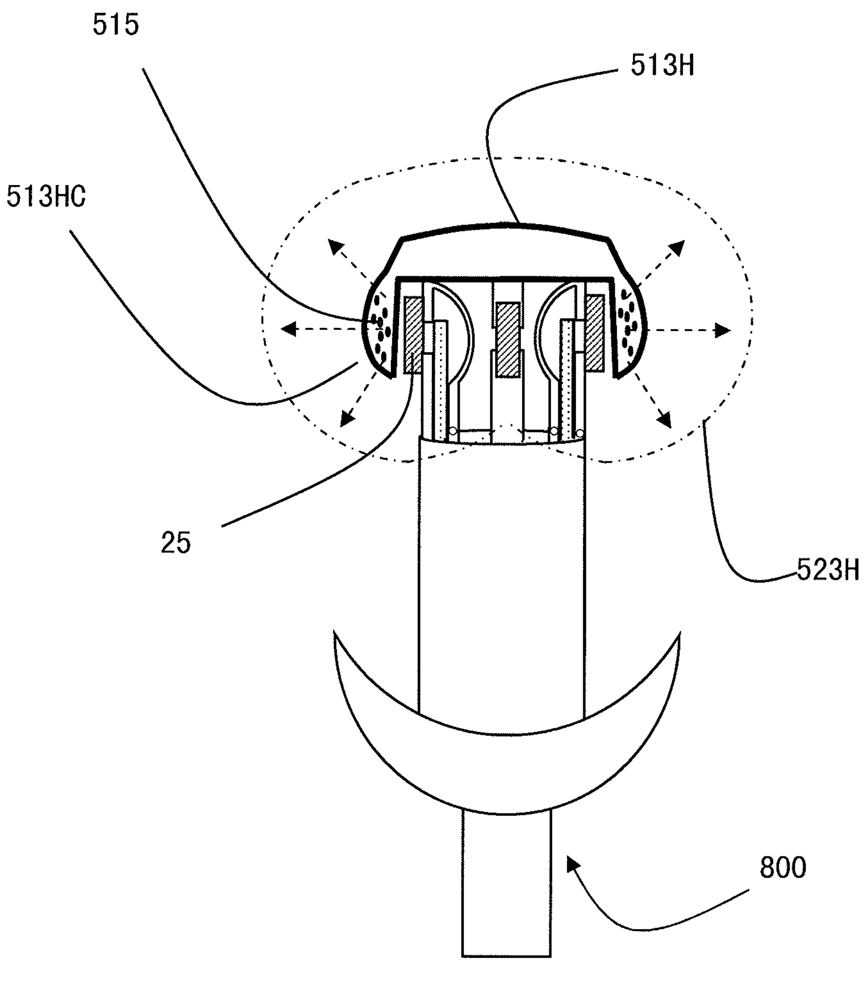
FIG. 18 is a sixth cap lens used for the lamp according to the present invention.

FIG. 18 is a sixth cap lens used for the lamp according to the present invention.

FIG. 18 shows that the circular wall cap lens 513H has reflective particles 515 mixed inside the wall lens 513HC to give a different modification effect to the light emission. The wall lens 513HC modifies the light emission of the light chips 25 to develop a beam profile 523H.

Figure 19:
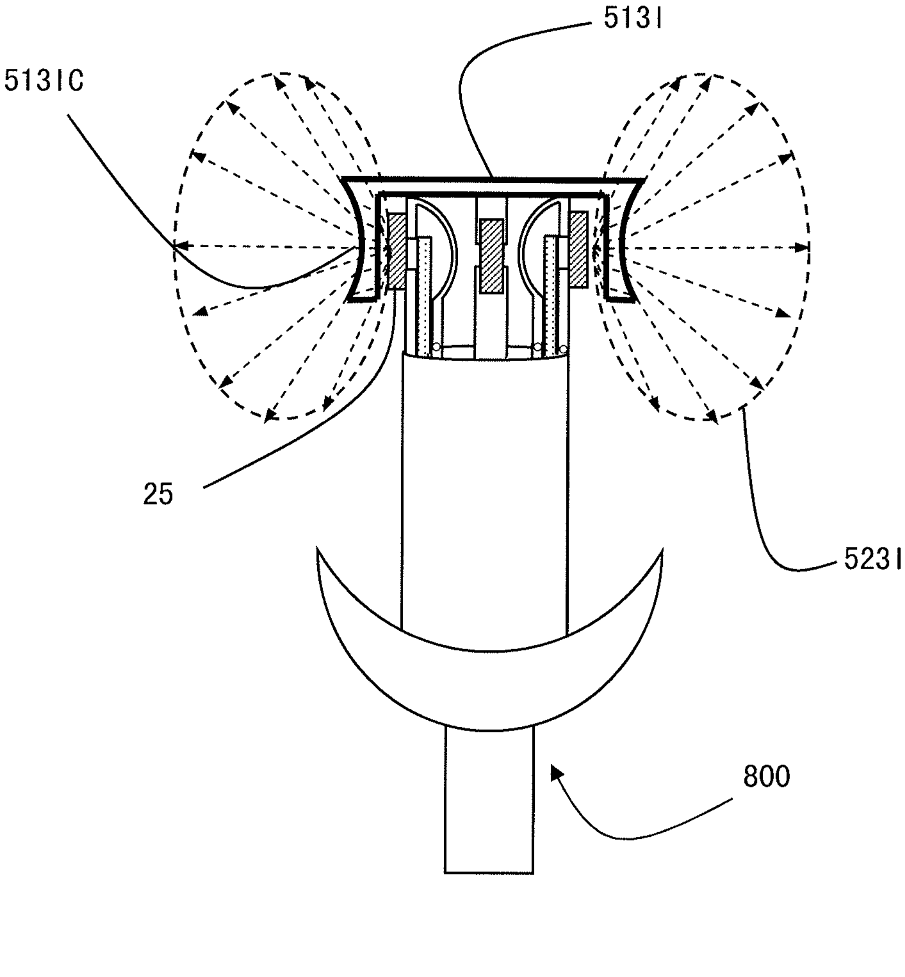
FIG. 19 is a seventh cap lens used for the lamp according to the present invention.

FIG. 19 is a seventh cap lens used for the lamp according to the present invention.

FIG. 19 shows that the cap lens 513I has a circular wall 513IC configured in front of the light chips 25. The circular wall lens 513IC is a plano-concave lens with respective to each light chip 25. The wall lens 513IC modifies the light emission of the light chips 25 to develop a beam profile 523I.

Figure 20:
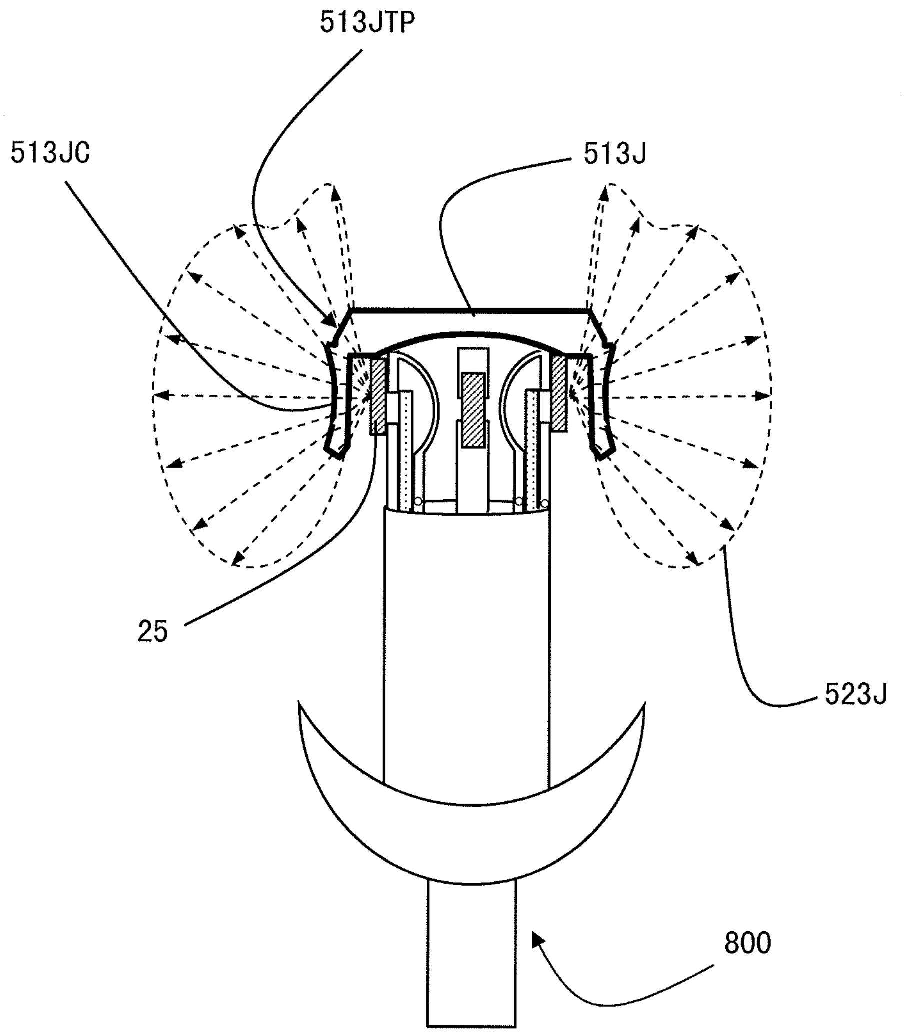
FIG. 20 is an eighth cap lens used for the lamp according to the present invention.

FIG. 20 is an eighth cap lens used for the lamp according to the present invention.

FIG. 20 shows that the wall lens 513JC is used, which is a modified version to the wall lens 513JC. The outer top of the wall lens 513JC is upward tapered in. The wall lens 513JC modifies the light emission of the light chips 25 to develop a beam profile 523J.

Figure 21A:
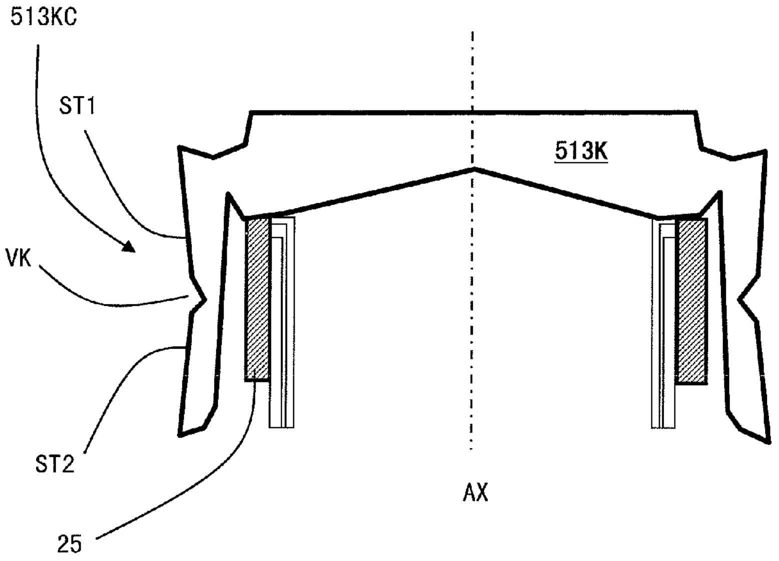
FIG. 21A~21B is a ninth cap lens used for the lamp according to the present invention.

FIG. 21A is a ninth cap lens used for the lamp according to the present invention.

Figure 21B:
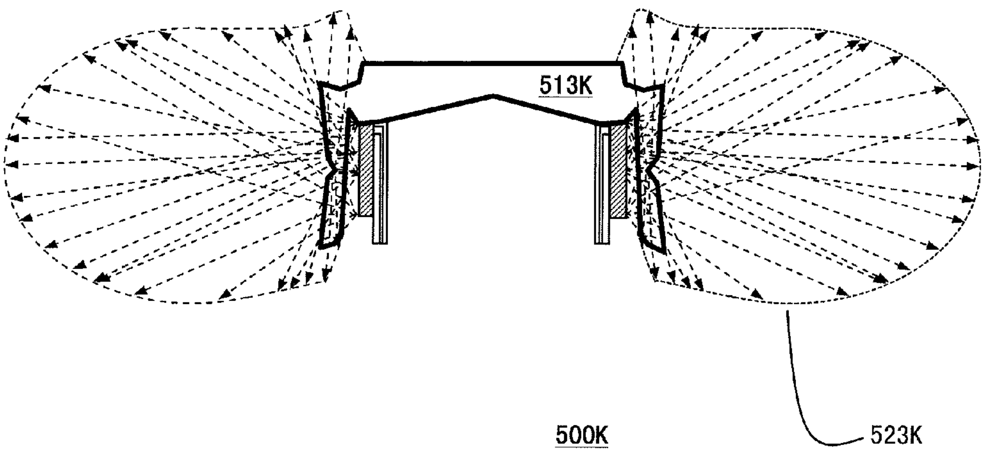

FIG. 21 shows that a cap lens 513K is used. The cap lens 513K has a circular wall lens 513KC which includes a flat inner surface tapered out, a cut VK configured in the middle latitude of an outer surface of the wall lens 513KC, an outer upper surface ST1 tapered in towards the cut VK from top, and an outer lower surface ST2 tapered in towards the cut VK from bottom. FIG. 21B shows a beam profile developed by the cap lens of FIG. 21A. FIG. 21B shows the beam profile 523K developed by the wall lens 513KC.

Figure 22A:
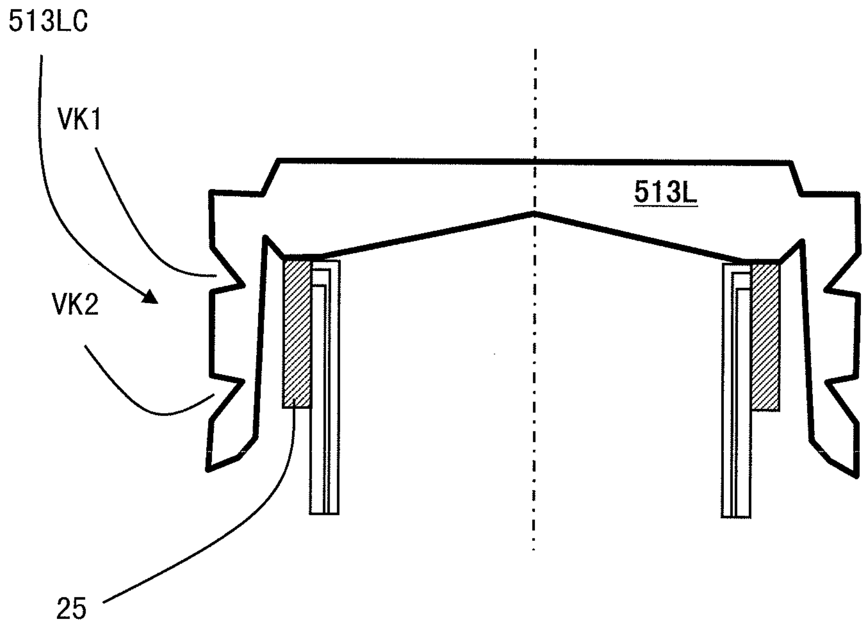
FIG. 22A~22B is a tenth cap lens used for the lamp according to the present invention.

FIG. 22A is a tenth cap lens used for the lamp according to the present invention.

Figure 22B:
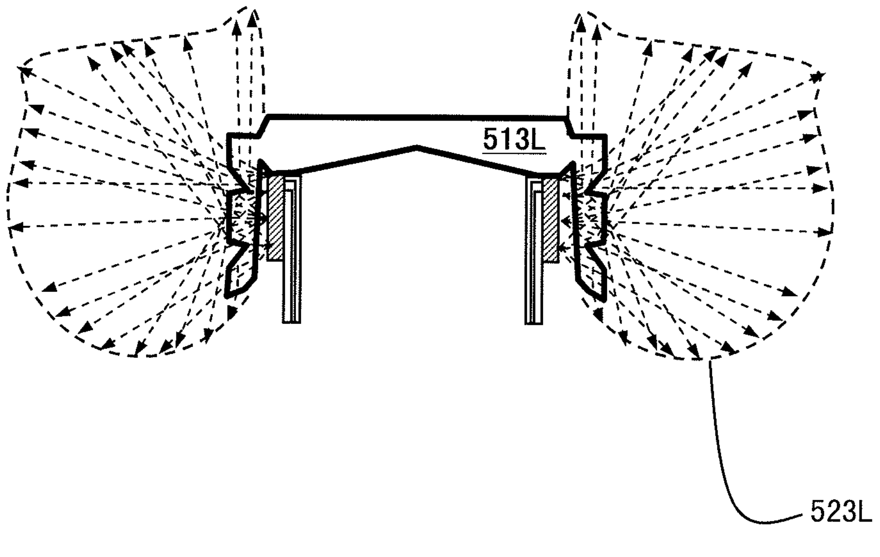

FIG. 22A shows that a cap lens 513L is used. The cap lens 513L has a circular wall lens 513LC which includes a flat inner surface tapered out, an upper cut VK1 configured in the middle-up of an outer surface of the wall lens 513LC, a lower cut VK2 configured in the middle-down of an outer surface of the wall lens 513LC. FIG. 22B shows the beam profile 523L developed by the wall lens 513LC.

Figure 23A:
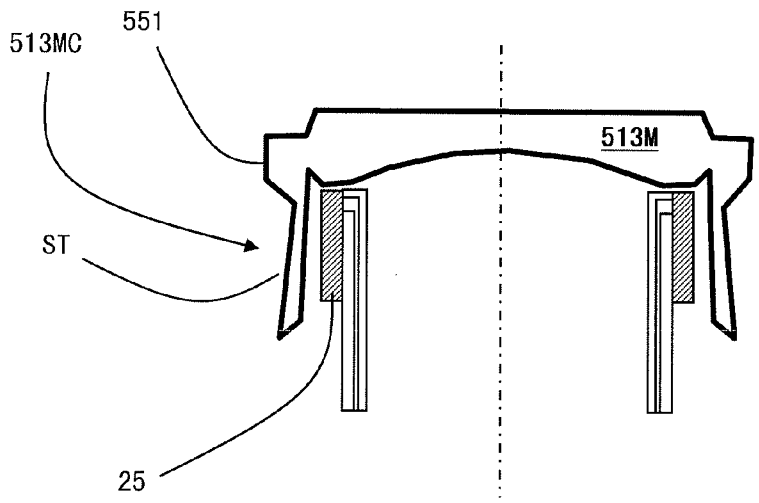
FIG. 23A~23B is an eleventh cap lens used for the lamp according to the present invention.

FIG. 23A is an eleventh cap lens used for the lamp according to the present invention.

Figure 23B:
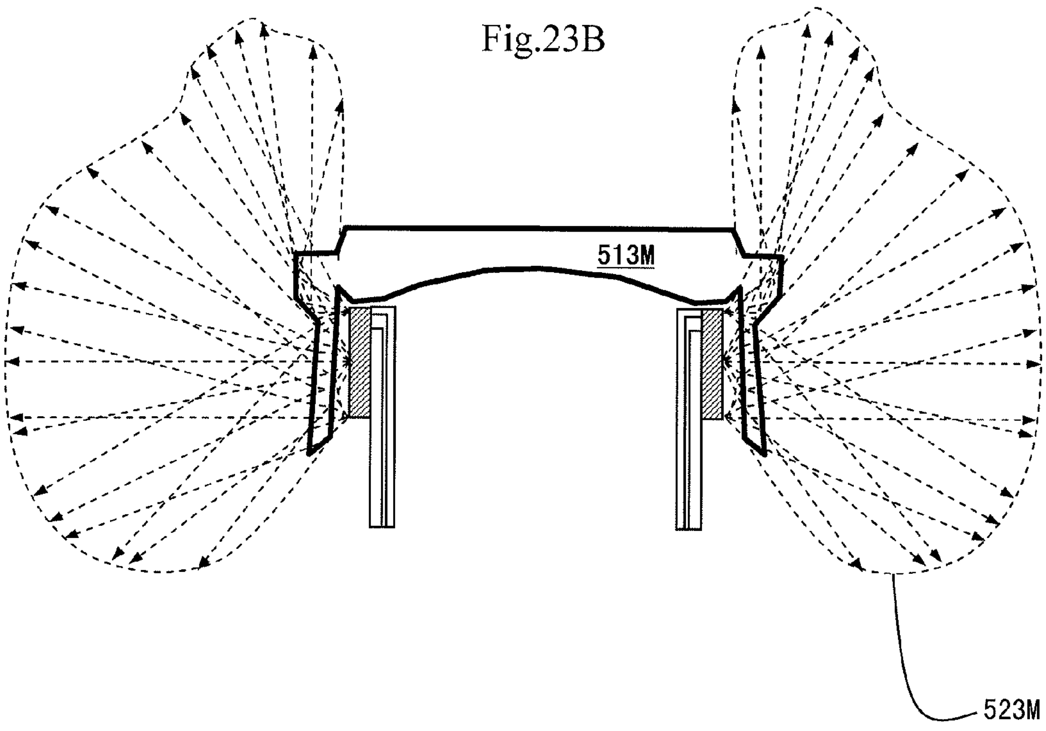

FIG. 23A shows that a cap lens 513M is used. The cap lens 513M has a circular wall lens 513MC. The wall lens 513MC has an inner surface tapered out in a first slope, and an outer surface tapered out in a second slope smaller than the first slope. A flange 551 is configured on a top of the wall lens 513MC, the flange 551 has an outer diameter larger than an outer diameter of the wall lens 513MC. FIG. 23B shows the beam profile 523M developed by the wall lens 513MC.

Figure 24:
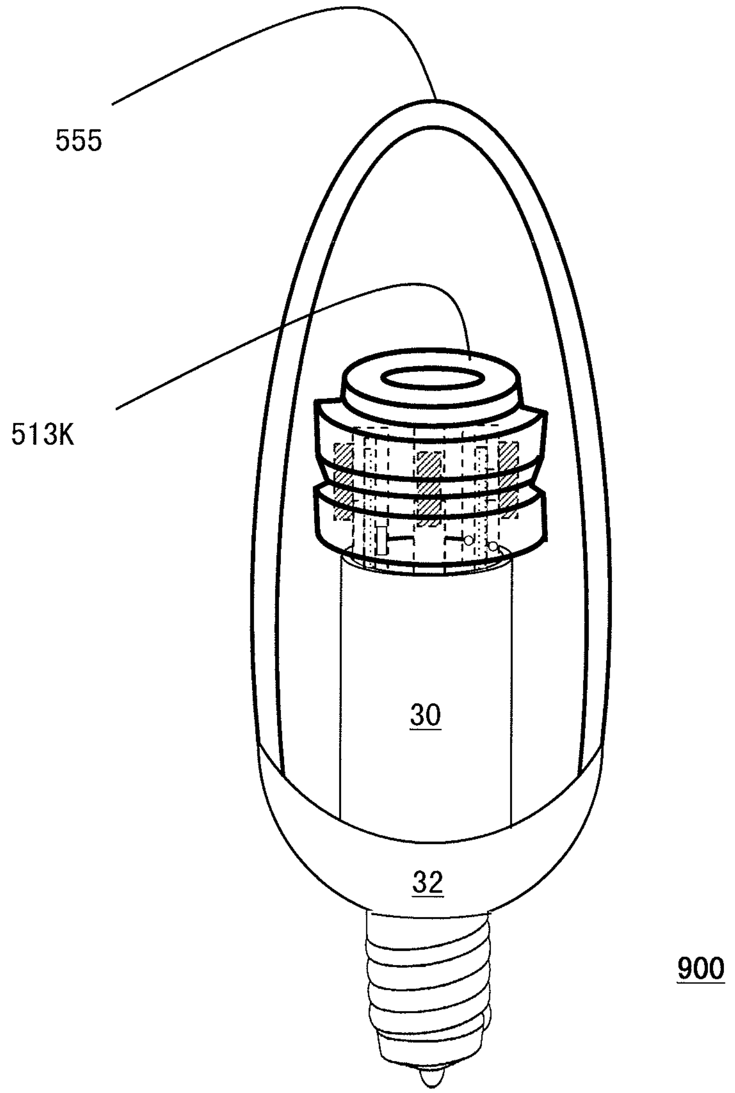
FIG. 24 is an outer protection used for the lamp according to the present invention.

FIG. 24 is an outer protection used for the lamp according to the present invention.

An oval protection 555 is optionally mounted on a pan base 32 of the lamp of 21A/21B, which makes the lamp 900 similar to a traditional lamp profile.

While several embodiments have been described by way of example, it will be apparent to those skilled in the art that various modifications may be configured without departing from the spirit of the present invention. Such modifications are all within the scope of the present invention, as defined by the appended claims.

What is claimed is:

1. A light unit, comprising:

a first metal;

a second metal, having a surface coplanar with a surface of the first metal;

a gap, formed between the first metal and the second metal;

a third metal, parallel with the first metal;

an insulation layer, sandwiched in between the first metal and the third metal;

a bridging metal, connecting the second metal to the third metal; and a light chip, straddling the gap; having a first electrode coupled to the first metal, and having a second electrode coupled to the second metal.

2. A light unit as claimed in claim 1, further comprising:

a first tab, extending from a fringe of the first metal in a first direction; and a second tab, extending from a fringe of the second metal in a second direction opposite to the first direction; wherein the second tab has an elevation similar to an elevation of the first tab, so that the first tab of a first unit is being able to electrically contact with the second tab of a neighboring second unit.

3. A light unit as claimed in claim 2, wherein the bridging metal connects a bottom end of the second metal with a top end of the third metal.

4. A light unit as claimed in claim 2, wherein the bridging metal connects a top end of the second metal with a top end of the third metal.

5. A light unit as claimed in claim 3, wherein the bridging metal is a flat metal.

6. A light unit as claimed in claim 4, wherein the bridging metal is a flat metal.

7. A light unit as claimed in claim 4, wherein the bridging metal is a belly-shaped metal.

8. A light unit as claimed in claim 2, wherein a connection of the bridging metal and the third metal forms an L-shaped turn.

9. A light unit as claimed in claim 2, wherein a connection of the second metal, the bridging metal and the third metal forms an N-shaped turn.

10. A panorama lamp, comprising:

a first light unit as claimed in claim 8;

a second light unit as claimed in claim 8;

a tube substrate, having a circular wall;
the first light unit, mounted on an inner surface of the circular wall; and
the second light unit, mounted on an inner surface of the circular wall; wherein each of the light units faces outward in a direction normal to an axis of the tube substrate.

11. A panorama lamp, comprising:
a first light unit as claimed in claim 9;
a second light unit as claimed in claim 9;
a tube substrate, having a circular wall;
the first light unit, mounted on an inner surface of the circular wall; and
the second light unit, mounted on an inner surface of the circular wall; wherein each of the light units faces outward in a direction normal to an axis of the tube substrate.

12. A panorama lamp as claimed in claim 10, further comprising:
a transparent protection cap, mounted on a top of the lamp; having a circular wall configured in front of the chips.

13. A panorama lamp as claimed in claim 12, wherein the circular wall is a circular wall lens.

14. A panorama lamp as claimed in claim 13, wherein an inner surface of the circular wall is tapered out.

15. A panorama lamp as claimed in claim 13, wherein the circular wall lens is a plano-convex lens.

16. A panorama lamp as claimed in claim 15, wherein the lens has a roughened outer surface.

17. A panorama lamp as claimed in claim 15, further comprising reflective particles, distributed inside the lens.

18. A panorama lamp as claimed in claim 15, wherein an inner surface of the wall lens is tapered out.

19. A panorama lamp as claimed in claim 13, wherein the circular wall lens is a plano-concave lens.

20. A panorama lamp as claimed in claim 13, wherein the circular wall lens having:
a flat inner surface, tapered out with a first slope;
a cut, configured in the middle latitude of an outer surface;
an outer upper surface tapered in towards the cut; and
an outer lower surface tapered in towards the cut.

21. A panorama lamp as claimed in claim 13, wherein the circular wall lens having:
a flat inner surface tapered out with a first slope;
a upper cut, configured in the middle-up latitude of the wall; and
a lower cut, configured in the middle-down latitude of the wall.

22. A panorama lamp as claimed in claim 13, wherein the wall lens comprising:
an inner surface, tapered out in a first slope; and
an outer surface, tapered out in a second slope smaller than the first slope; and
a flange, configured on a top of the wall lens, having an outer diameter larger than an outer diameter of the wall lens.

23. A panorama lamp as claimed in claim 20, further comprising:
an outer protection, configured on top of a pan base of the lamp.

24. A panorama lamp as claimed in claim 23, wherein the outer protection is in a shape of a pan.

25. A lens, comprising:
a transparent top plate; and
a circular wall lens, connecting to a bottom periphery of the plate.

26. A lens as claimed in claim 25, wherein the wall lens is plano-convex.

27. A lens as claimed in claim 26, wherein an outer surface of the wall lens is roughened.

28. A lens as claimed in claim 25, further comprising reflective particles, distributed inside the lens.

29. A lens as claimed in claim 25, wherein an inner surface of the wall lens is tapered out.

30. A lens as claimed in claim 25, wherein the wall lens is plano-concave.

31. A lens as claimed in claim 25, wherein the wall lens comprising:
a flat inner surface, tapered out with a first slope;
a cut, configured in the middle latitude of an outer surface;
an outer upper surface tapered in towards the cut; and
an outer lower surface tapered in towards the cut.

32. A lens as claimed in claim 25, wherein the wall lens comprising:
a flat inner surface tapered out with a first slope;
a upper cut, configured in the middle-up latitude of the wall; and
a lower cut, configured in the middle-down latitude of the wall.

33. A lens as claimed in claim 25, wherein the wall lens comprising:
an inner surface, tapered out in a first slope; and
an outer surface, tapered out in a second slope smaller than the first slope; and
a flange, configured on a top of the wall lens, having an outer diameter larger than an outer diameter of the wall lens.

* * * * *